May 12, 1925.
W. STANCHFIELD
ANIMAL TRAP
Filed June 2, 1924
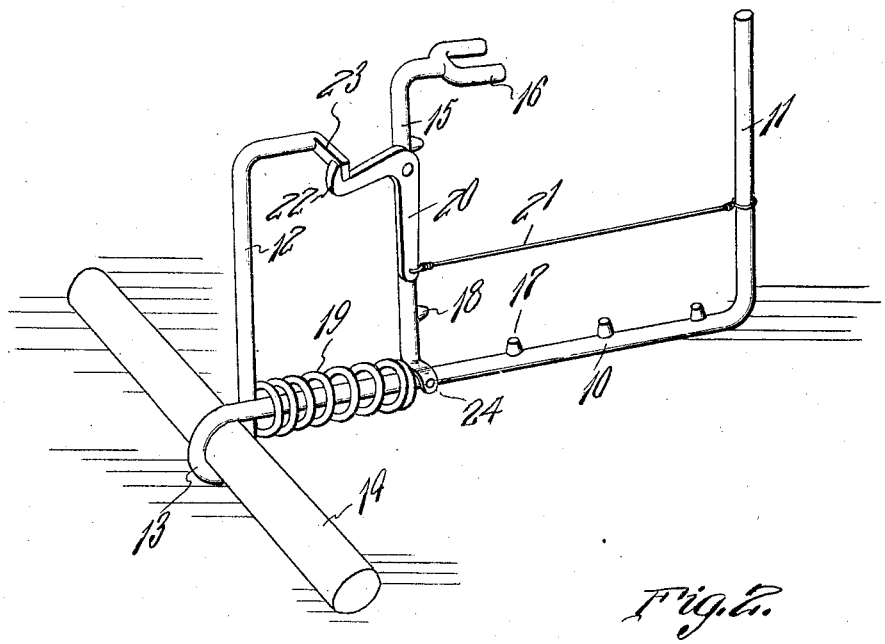
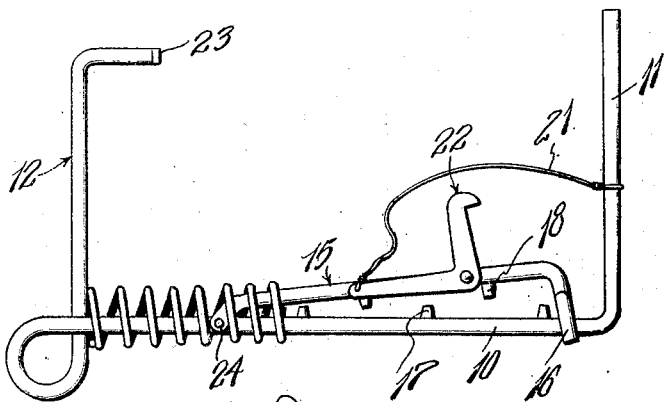
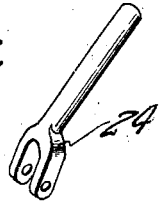
W. Stanchfield
INVENTOR
BY Victor J. Evans
ATTORNEY
WITNESS:

Patented May 12, 1925.

1,537,896

UNITED STATES PATENT OFFICE.

WALTER STANCHFIELD, OF AUSTIN, PENNSYLVANIA.

ANIMAL TRAP.

Application filed June 2, 1924. Serial No. 717,367.

*To all whom it may concern:*

Be it known that I, WALTER STANCHFIELD, a citizen of the United States, residing at Austin, in the county of Potter and State of Pennsylvania, have invented new and useful Improvements in Animal Traps, of which the following is a specification.

It is the purpose of this invention to provide an animal trap designed to instantly kill the animal by breaking its neck, the trap being very simple in construction, and efficient and positive in operation.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a perspective view of the trap.

Figure 2 is a side elevation showing the movable jaw in its active position.

Figure 3 is a fragmentary detail view of said jaw.

The trap forming the subject matter of the present invention essentially embodies a substantially U-shaped frame which constitutes the base of the trap and adapted to be arranged upon the ground as shown in Figure 1. In other words the body portion 10 of the frame reposes upon the ground, while the substantially parallel members 11 and 12 respectively are vertically disposed. The body portion 10 at its point of juncture with the vertically disposed member 12 is formed to provide a loop 13, the latter being adapted to receive an element 14 of any suitable character, which element serves to support the trap as shown in Figure 1. Pivoted upon the body portion 10 of said frame is the shank 15 forming part of a movable jaw, the jaw being indicated at 16 and offset at a right angle with relation to the shank as illustrated. The jaw is of U-shape formation, so that when moved to its active position it straddles the body portion 10 as shown in Figure 2. This body portion is formed with a plurality of upstanding lugs 17 suitably spaced apart, while carried by the shank 15 of the movable jaw are similar lugs arranged in staggered relation with respect to the lugs 17. Supported upon the body portion 10 is a coil spring 19, one end of which bears against the adjacent vertical member 12 of said frame, while the other end normally bears against the shank 15 of the movable jaw, exerting pressure thereagainst, so that when the jaw is released in the manner to be presently described, the spring functions to forcibly throw the jaw into its active position with relation to the body portion 10 as shown in Figure 2. During this movement of the jaw 16 the animal is trapped between the body portion 10 and said movable jaw, the jaw straddling the neck of the animal and striking the neck with such force as to break the neck, thereby instantly killing the animal.

Pivoted upon the shank 15 of the movable jaw is a trigger 20, one end of which is connected with a flexible element 21 and the other end of this element is connected with the vertically disposed portion 11 of the frame above referred to. The other end of the trigger is formed with an offset lug 22 which is adapted to engage the adjacent branch 23 of a substantially L-shaped extension projecting from the upper end of the vertically disposed member 12 of the frame, and thus hold the shank 15 of the movable jaw in a set position against the tension of the spring 19. When the trap is set, the parts are arranged in the manner illustrated in Figure 1, wherein it will be noted that the flexible element 21 is taut and arranged directly above and parallel with the body portion 10 of the frame. This may or may not support a bait, but it is obvious that when the animal comes in contact with the flexible element, the trigger 20 is moved upon its pivot to release the movable jaw, whereupon the spring 19 forcibly throws the jaw to its active position shown in Figure 2. While the jaw can be pivoted in any suitable manner on the body portion 10, the shank 15 is preferably bifurcated at one end as at 24, which end straddles the body portion 10 and is pivotally connected therewith.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A trap of the character described comprising a base, a vertical member rising from one end of the base, a movable jaw including a shank pivoted on said base and normally arranged vertically in parallelism with said member, said jaw projecting at a right angle from said shank and designed to straddle the base when said jaw assumes its active position, lugs rising from said base, similar lugs carried by said shank and arranged in staggered relation with the first mentioned lugs, means for holding said shank in its normal position, a flexible element terminally connected with said means and with said vertical member, and adapted to effect a release of said shank when the body of the animal is brought into contact with said element, and means for forcibly moving said shank to its active position when released.

2. A trap of the character described including a substantially U-shaped base frame, having its parallel portions vertically disposed, a movable jaw including a shank pivoted on said frame and normally arranged vertically in parallelism with said parallel portion, said jaw projecting at a right angle from said shank and designed to straddle the base portion of said frame when moved to its active position, a trigger pivoted on said shank, an extension projecting from the upper end of one of the parallel portions of the frame, and adapted to be engaged by said trigger for holding the shank in its normal position, animal actuated means for operating the trigger to effect a release of said shank, and means for forcibly moving the shank and its jaw to an active position when released.

3. A trap of the character described comprising a substantially U-shaped frame constituting a base, with its parallel portions arranged vertically, a loop formed at one end of the frame and adapted to receive a transverse member for supporting the trap upon the ground, a movable jaw including a shank pivoted on the body portion of the frame and normally arranged in parallelism with said parallel portions, said jaw being arranged at a right angle to said shank and of substantially U-shaped formation, means for holding said shank in its normal position, animal actuated means for effecting a release of said shank, and means for forcibly moving said shank and jaw to active position when released.

4. A trap comprising a substantially U-shaped base frame, having its parallel portions vertically disposed, a loop formed at one end of the frame and adapted to receive a transverse member for supporting the trap upon the ground, the movable jaw including a shank pivoted on said frame and normally arranged parallel with said parallel portions of the frame, said jaw projecting at a right angle from said shank and designed to straddle the base of the frame when moved to its active position, a trigger pivoted on said shank, an extension projecting from one of the parallel portions of the frame and adapted to be engaged by said trigger for holding the shank in its said normal position, a flexible element terminally connected with the other of said parallel portions of the frame and with said trigger, whereby said trigger is actuated to effect a release of said shank when the body of the animal contacts said element, and means for forcibly moving said shank and jaw to an active position when released.

In testimony whereof I affix my signature.

WALTER STANCHFIELD.